United States Patent [19]

Nagura et al.

[11] Patent Number: 5,840,378
[45] Date of Patent: Nov. 24, 1998

[54] ENDLESS FABRIC FOR CONDENSING PAPER MATERIAL AND METHOD OF MAKING THEREOF

[75] Inventors: Hiroyuki Nagura; Takehito Kuji, both of Tokyo, Japan

[73] Assignee: Nippon Filcon Co., Ltd., Tokyo, Japan

[21] Appl. No.: 766,593

[22] Filed: Dec. 12, 1996

[30]  Foreign Application Priority Data

Dec. 13, 1995 [JP] Japan .................................. 7-349924
Nov. 15, 1996 [JP] Japan .................................. 8-338831

[51] Int. Cl.$^6$ ...................................................... B32B 23/02
[52] U.S. Cl. .............................. 428/57; 428/58; 428/192; 428/193; 442/204
[58] Field of Search ..................... 428/192, 193, 428/57, 58; 442/204

[56]  References Cited

FOREIGN PATENT DOCUMENTS 03-228126  5/1991  Japan .

Primary Examiner—James J. Bell
Attorney, Agent, or Firm—Foley & Lardner

[57]  ABSTRACT

An endless woven fabric for condensing paper material and a method for forming such an endless fabric which removes ink and other extraneous substances from the aqueous solution of reclaimed paper material. On the endless fabric formed by weaving plastic monofilaments, an antiflexing part, 30–50 mm in width, is provided on at least one end of the selvage in the direction of width by causing thermoplastic resin to fill not less than 85% of an empty space in the endless woven fabric. Further, a guide ridge of thermoplastic resin is formed by causing thermoplastic resin to fill an empty space in the end parts on the running surface of the endless fabric, and is welded with the antiflexing part integrally. Platelike reinforcing strips are formed in a length nearly equal to the width of the endless fabric. The strips are extended between the opposite ends of the endless fabric by causing thermoplastic resin of the strips to fill not less than 85% of an empty space in the endless fabric.

23 Claims, 10 Drawing Sheets

ENDLESS FABRIC FOR CONDENSING PAPER MATERIAL AND METHOD OF MAKING THEREOF

BACKGROUND OF THE INVENTION

This invention relates to a condensing endless fabric for removing ink particles, ashes, and other similar extraneous substances from the aqueous solution of paper material reclaimed as from old newspapers in consequence of removal of ink, removal of ashes, and the like and a method for the production thereof.

Among the known condensing endless fabrics is counted, for example, what is obtained by sewing ridges one each to the opposite edges in the direction of width of a woven fabric as disclosed in Japanese Laid-open Patent No. 2-14090/1990.

In the condensation of the solution of paper material such as old newspapers, unlike that which accompanies the papermaking, the solution is not uniformly supplied piecemeal onto an endless woven fabric but is damped thereon in a state having solid matter unevenly dispersed therein. The solution, therefore, exerts a large load unevenly on the endless woven fabric and forces this endless woven fabric to advance obliquely while in motion and occasionally run off an inner roll.

For the purpose of precluding this phenomenon, an idea of providing the inner roll severally with a groove and disposing guide ridges capable of fitting such grooves one each along the opposite edges in the direction of width of the fabric has been tried. The fabric, while in motion, is quickly broken by the edge face parts of the guide ridges that face the center of the fabric.

This breakage of the fabric similarly occurs when the oblique advance of the fabric is prevented by causing the lateral faces of guide ridges to keep contact with the lateral faces of inner roll instead of providing the inner roll with fitting grooves.

The known art taught by Japanese Laid-open Patent No. 2-14090/1990 mentioned above contemplates preventing this breakage by means of guide ridges which are sewn to the fabric. The fixation by sewing, unlike that by fusion, appreciably allays the wear of the fabric which precedes breakage because it interposes a clearance between the ridges and the fabric.

This known art however, is at a disadvantage in permitting no perfect prevention of the breakage and inducing degradation of the guides in performance.

Japanese Laid-open Patent No. 4-361682/1992 discloses a condensing endless fabric which results from preparing an endless woven fabric formed by weaving plastic monofilaments, disposing antiflexing parts packed with polyurethane resin one each along the selvages of the endless woven fabric, and disposing guide ridges formed of polyurethane resin one each on the antiflexing parts.

Though this net or fabric manifests an excellent guiding ability, it is at a disadvantage in suffering the inner terminal portions of the antiflexing parts to sustain breakage while the fabric is in service.

This invention aims to provide a woven fabric which excels in ability to guide motion and in strength to resist breakage enough to preclude the disadvantage mentioned above and a method for condensing paper material such as, for example, old newspapers by the use of the woven fabric.

SUMMARY OF THE INVENTION

This invention concerns a condensing endless fabric for paper material, comprising an endless woven fabric formed by weaving plastic monofilaments, antiflexing parts, 30–50 mm in width, formed by filling not less than 85% of the empty space in the woven fabric with thermoplastic resin and disposed on at least one end of either selvage in the direction of width of the endless woven fabric, guide ridges formed of thermoplastic resin and disposed as integrally welded with the thermoplastic resin filling the running surface of the antiflexing part, and platelike reinforcing strips formed by filling not less than 85% of the empty space in the woven fabric with thermoplastic resin in a length substantially equal to the width of the woven fabric as extended between the opposite ends of the width. The woven fabric may be a multi-ply woven fabric produced by superposing wefts of plastic monofilaments in at least three layers and interlacing warps of plastic monofilaments through the wefts. The multi-ply woven fabric may have auxiliary wefts interposed between the wefts of the lowermost layer.

This invention further concerns a method for the production of a condensing endless fabric for paper material, characterized by laying a thermoplastic resin sheet, 30–50 mm in width and 1–1.5 mm in thickness, on at least one end of either selvage in the direction of width of an endless fabric formed by weaving plastic monofilaments, thermally pressing the sheet thereby filling not less than 85% of the empty space in the woven fabric in the selvage with thermoplastic resin and consequently forming an antiflexing part, 30–50 mm in width, welding a ridge of thermoplastic resin on the running surface of the antiflexing part thereby disposing the ridge as welded integrally with the thermoplastic resin of the antiflexing part, and disposing a platelike reinforcing strip formed by filling not less than 85% of the empty space in the woven fabric with thermoplastic resin in a length substantially equal to the width of the woven fabric as extended between the opposite ends of the width. The woven fabric formed of plastic monofilaments may be a multi-ply woven fabric. Further, according to this invention, the endless woven fabric may be formed by preparing a length of woven fabric by weaving plastic monofilaments, abutting the opposite end parts of the woven fabric, setting a reinforcing strip on the side opposite the running surface of the abutted parts, and fastening the reinforcing strip with the abutted parts by simultaneous application of heat and pressure.

PREFERRED EMBODIMENTS OF THE INVENTION

Figure 1:
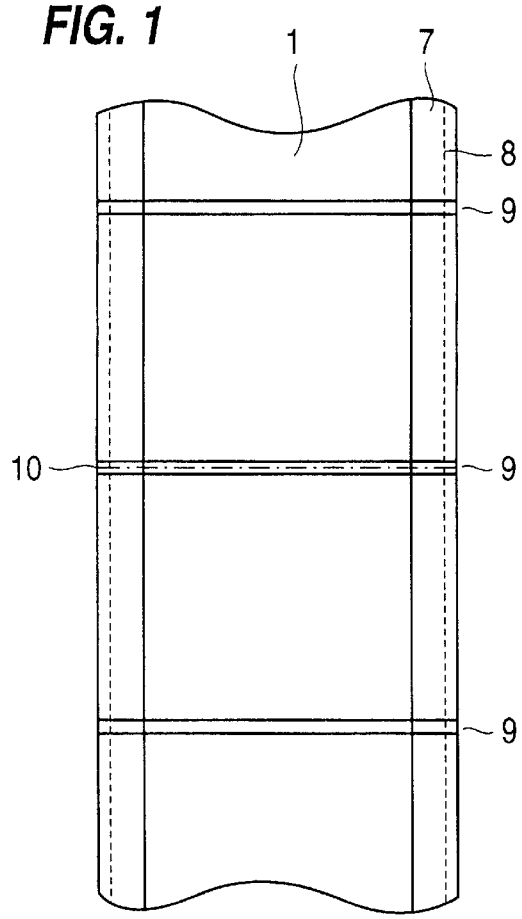
FIG. 1 is a plan view illustrating one example of this invention.

The woven fabric to be used in this invention is produced by weaving warps of polyethylene terephthalate monofilaments and wefts of polyethylene terephthalate monofilaments and/or polyamid monofilaments. The space ratio of this woven fabric is, e.g., in the range of 45–70% and the thickness thereof in the range of 0.5–1.5 mm, for example.

Since this woven fabric is composed of warps and wefts, it is not a rigid article. Even when it is given a finishing treatment, it does not necessarily exhibit uniform elongation, resistance to tension, or rigidity. When the woven fabric is rotated in an endless form, therefore, it tends to gather gradually from the side of larger elongation to the side of smaller elongation. Owing to the array of crimps on the running surface of the woven fabric, the woven fabric tends to advance obliquely and swerve on one side. The woven fabric similarly tends to swerve on one side when the rolls of a device for imparting an endless rotation to the woven fabric have not been perfectly centered.

The oblique advance of the woven fabric arises from various causes. The direction of this oblique advance, therefore, is decided by the woven fabric itself and by the device imparting an endless rotation to the woven fabric as well.

When the direction of the oblique advance is fixed, therefore, it ought to suffice to provide a guide ridge only on the selvage lying opposite that direction. Normally, it is proper to have guide ridges disposed one each on the opposite selvages because the direction of the oblique advance is not known until the woven fabric is actually put to rotation.

Incidentally, the condensation of paper material reclaimed from old newspapers, for example, is effected by supplying the solution of this paper material onto the woven fabric or between the woven fabric and inner roll and compressing the solution between the woven fabric and the inner roll and dehydrating it by means of centrifugal force. When the solution of great weight lands on the woven fabric or between the woven fabric and the inner roll, therefore, the woven fabric suffers change in the tension and acceleration of the oblique advance. When the oblique advance is serious, the woven fabric eventually runs off the inner roll.

In the arrangement in which guide ridges are disposed on the end parts in the direction of width of the woven fabric and are meshed with grooves provided on the inner roll to guide the woven fabric, when the depth of the grooves nearly equals the height of the guide ridges and the woven fabric consequently tends to move inward relative to the guide ridges, the inner surfaces of the guide ridges come into contact with the inner wall surfaces of the grooves in the portion of the woven fabric that is contiguous to the inner roll. Since the woven fabric is compelled to move further inward and the guide ridges are drawn inward possibly to the extent of running off the grooves, the outer sides of the guide ridges are, raised and the woven fabric is flexed in the proximity of the inner surfaces of the guide ridges.

In contrast, when the woven fabric tends to move outward relative to the guide ridges, the outer surfaces of the guide ridges come into contact with the outer wall surfaces of the grooves in the portion of the woven fabric that is contiguous to the inner roll. Consequently, the guide ridges are pushed outward possibly to the extent of running off the grooves and the inner sides of the guide ridges are raised and the woven fabric is flexed as pressed against the guide ridges.

The woven fabric is relieved of the flexure when it departs from the inner roll. Since this flexing motion is repeated, the woven fabric is ultimately broken in the proximity of the inner lateral surfaces of the guide ridges.

An attempt to loosen the adhesion of the guide ridges from the woven fabric and interpose a clearance therebetween and enable the guide ridges to move slightly when the woven fabric is pressed against the guide ridges indeed allays slightly the flexure and yet fails to prevent the breakage. Moreover, the loosened adhesion of the guide ridges brings about the disadvantage that the guide ridges suffer impairment of performance and tend more to run off the grooves in the inner roll. One ridge may be provided on one end in the direction of width of the woven fabric or two ridges may be provided one each on the opposite ends thereof. Of course, the guide ridges may be allowed to guide the woven fabric by virtue of their contact with the end surfaces of the inner roll.

In this case, it is preferred for the woven fabric to be provided with two guide ridges one each on either edge in the direction of width thereof. When the woven fabric is stretched taut, the guide ridges have lower tension than the woven fabric because they are not laid taut directly on the inner roll and are not directly exposed to the tension working on the woven fabric.

As a result, the guide ridges are flexed on the end faces of the inner roll in the axial direction of the inner roll in the part of the woven fabric that is contiguous to the inner roll. By this reason, the woven fabric is flexed in the proximity of the inner lateral surfaces of the guide ridges. The flexure of the woven fabric is alleviated to the extent of a light bend when the woven fabric separates from the inner roll. When this flexure is continuously repeated, the flexure of the guide ridges in the axial direction of the inner roll mentioned above compels the woven fabric in the proximity of the guide ridges to be worn by the end shoulder parts of the inner roll and consequently broken ultimately in the proximity of the inner lateral surfaces of the guide ridges.

The breakage of the woven fabric similarly occurs when the inner roll to be used is provided with grooves having a greater depth than the height of the guide ridges.

This invention contemplates laying antiflexing parts of thermoplastic resin, 30–50 mm in width, for example, at the positions at which the guide rolls are to be installed in the end parts in the direction of width of the woven fabric and fixing the guide ridges by fusion to the antiflexing parts. Since this fusion produces strong bondage between the woven fabric and the guide rolls, the guide rolls enjoy perfect guiding property.

In the antiflexing part, when a thermoplastic sheet is superposed on opposite end parts in the direction of width of the woven fabric and fastened thereto by simultaneous application of heat and pressure, the thermoplastic resin permeates also into the texture of the woven fabric and gives birth to selvages which are integrally bound with the woven fabric and are not flexed. Properly, the antiflexing parts have a width in the range of 30–50 mm. The width less than 30 mm can be acceptable. The selvages however, will tend to yield to flexure. Though the width is allowed to exceed 50 mm, the excess will produce no proportionate addition to the expected effect.

The thermoplastic resin to be used in this invention may be nylon, polyester resin, or vinyl chloride resin, for example. Most preferably, polyurethane resin is used.

The following description will be based on cases of using polyurethane resin, the most preferable thermoplastic resin.

The amount of the polyurethane resin in the antiflexing part is required to be such as to fill not less than 85% of the empty space in the woven fabric. If this amount is less than 85%, the antiflexing part will produce an insufficient antiflexing effect and permit no sufficient fusion with the guide ridge. Since the guide ridge is intended to be fused with the antiflexing part, it is most preferably formed with the same polyurethane resin as the polyurethane resin sheet mentioned above. The cross section of the ridge is only required to conform to that of the groove in the inner roll. It may be in a rectangular, a circular, or a triangular shape, for example. The ridge having a cross section of the shape of a trapezoid proves advantageous in affording a large area for fusion.

The reason for using polyurethane resin for manufacturing the ridges and the selvages is that this resin possesses great strength, offers good resistance to wear, forms satisfactory bondage with a woven fabric, and manifests high flexibility enough for the ridges and the selvages to be smoothly folded back over the inner roll.

The ridges may be formed in the shape of a continuous rod or in the shape of a plurality of disconnected rods. In the latter shape, the ridges are folded back more smoothly over the inner roll.

This invention may further provide the condensing endless fabric with platelike reinforcing strips formed by filling not less than 85% of the empty space in the woven fabric with thermoplastic resin in a length nearly equal to the width of the fabric as extended between the opposite end parts of the fabric.

The reinforcing strips disposed on the woven fabric impart rigidity to the woven fabric, prevent the woven fabric from gathering wrinkles, permit the woven fabric to acquire increased tensile strength enough to confine possible variation in the elongation of the fabric in the direction of width thereof, and manifest an effect of preventing the woven fabric, when rotated endlessly, from advancing obliquely. Properly, the strips have a width in the range of 20–50 mm. If this width is less than 10 mm, the reinforcing strips will insufficiently manifest the effects mentioned above. If the width exceeds 50 mm, the excess will result in lowering the permeability of the woven fabric to water and producing adverse effects on the effect of condensation.

The rigidity of the reinforcing strips may be smaller in the opposite end parts in the direction of width thereof than in the central part thereof. By giving smaller rigidity to the opposite end parts, the possibility of the woven fabric breaking in the end parts of the reinforcing strips can be precluded. The decrease of rigidity in the opposite end parts of the reinforcing strips can be attained by decreasing the thickness of the reinforcing strips in the opposite end parts, boring small holes therein, incising grooves therein, corrugating, zigzagging, or undulating the opposite end parts in cross section, and varying the kind of resin in the opposite end parts. In the reinforcing strips having small holes provided in the opposite end parts in the direction of width thereof, the rigidity is small in the parts containing the small holes. The degree with which the rigidity is decreased can be set by varying the number and size of the holes. The gradual increase of the number of holes toward the end parts is at an advantage in allowing the rigidity to be gradually decreased.

The provision of grooves in the opposite end parts in the direction of width is also advantageous in respect that the grooves are effective in efficiently decreasing the rigidity in the direction of width.

The impartation of an undulating cross section or a corrugated cross section to the opposite end parts in the direction of width of the reinforcing strips brings about an advantageous effect of permitting gradual decrease of rigidity. Of course, these measures may be adopted as suitably combined. One combination may occur between gradual decrease of thickness and formation of small holes, for example. The portions of the woven fabric on the opposite end sides of the reinforcing strips may be impregnated with resin and the regions of resin lodged consequently in the woven fabric may be used as alternative reinforcing strips of small rigidity.

In the condensation of paper material, unlike that which accompanies the papermaking, the formation of such platelike strips as mentioned above on the woven fabric does not pose such problems as the occurrence of wire marks due to the unevenness of water filterability of the woven fabric. The reinforcing strips may be formed at a plurality of sites. Properly, they may be disposed as spaced uniformly.

The thermoplastic resin to be used for the reinforcing strips may be any of such resins as nylon, polyester resin, or vinyl chloride resin which are used for the antiflexing parts. Most preferably, polyurethane resin can be used.

The amount of the resin to form the reinforcing strips is required to be enough to fill not less than 85% of the empty space in the portion of the woven fabric forming the strips. If this amount is not more than 85%, the reinforcing strips will not be enough in bonding strength with the woven fabric, rigidity, and tensile strength.

The term "platelike" used herein in describing the shape of the reinforcing strips of this invention embraces bar-like objects. The provision of the reinforcing strips brings about the following outstanding effects.

Heretofore, a woven fabric elongated to two opposite ends formed by weaving fibers has been manufactured into an endless woven fabric. The connection of fibers involved in this case resorts to a procedure which comprises the steps of removing wefts from the end parts of the woven fabric, abutting the opposite end parts now formed solely of warps, interposing between the opposite end parts a separately prepared fraction of woven fabric deprived wholly of warps and formed solely of wefts, opening the wefts of the fraction in conformity with the texture of the woven fabric, and alternately inserting the warps of the opposite end parts into the consequently formed openings and completing a texture of a woven fabric. This work consumes much time and labor and constitutes itself the major cause for boosting the cost.

In contrast, in this invention, the endless woven fabric is obtained by simply abutting the opposite end parts of a woven fabric formed by cutting a woven fabric with scissors, laying a reinforcing strip on the abutted part, and joining the reinforcing strip and the abutted opposite ends by the simultaneous application of heat and pressure. According to this invention, since the endless woven fabric is formed simply by abutting the opposite end parts of a woven fabric and fastening a reinforcing strip to the abutted end parts by the combined action of heat and pressure, the work involved herein is performed easily and quickly, and it permits a generous reduction in cost. The strength of the bondage has absolutely no room for anxiety because the bondage originates in the resin of the reinforcing strip which fills the texture of the woven fabric in the opposite end parts and binds itself powerfully to the texture.

Another characteristic feature of this invention resides in the construction of the endless woven fabric. The antiflexing parts provided on the selvages of the endless woven fabric stabilize the guide ridges which are disposed thereon, improve the guide ridges in the property of guiding, and preclude the otherwise possible occurrence of breakage of the woven fabric in the proximity of the guide ridges.

However, there is a problem of suffering the woven fabric to break in the proximity of the inner terminal parts of the antiflexing parts. Various studies made with a view to solving this problem indicated that an attempt to enlarge the antiflexing parts must be avoided because it inevitably resulted in decreasing the area of the woven fabric available for the expected condensation. When the amount of the resin in the antiflexing parts was decreased to give increased flexibility to the antiflexing parts, the woven fabric was broken by flexure in the proximity of the guide ridges. A change in the kind of resin was not effective. Then, the construction of the woven fabric has attracted the inventors' attention. Thus, the inventors involved the construction.

The conventional endless woven fabric is designed to retain improved resistance to abrasion by sacrificing the wefts to wear and preventing the warps from breakage. When the cuts formed in the condensing endless woven fabric for paper material in the proximity of antiflexing parts were visually examined, it was found that the cuts occurred because the wefts of the fabric yielded to fibrillation in consequence of repeated flexure. It turned out that the improvement of the resistance to abrasion by shaving, therefore, produced no effect. When two sheets of woven fabric were superposed, they were broken nearly at the same time. Further, the construction of superposed sheets had the problem that the yarns binding the superposed sheets broke and the superposed sheets separated from each other.

This invention was originated in the appreciation of the necessity for improving the resistance of the woven fabric to flexure in the direction of wefts and preventing the wefts from fibrillation for the purpose of preventing the breakage of the woven fabric in the proximity of the antiflexing parts and has culminated in perfecting, through studies, a woven fabric which was constructed of a plurality of layers of wefts. Incidentally, a woven fabric which was constructed by severally laying warps and wefts in a multiplicity of layers manifested an elongation of service life, though not very conspicuously as compared with a woven fabric constructed of a single layer of warps. These practical experiments demonstrated that the construction of a multiplicity of layers of wefts is effective in the prevention of the breakage under discussion, which led the completion of the invention. On the other hand, no remarkable effect was observed when both multiple layers of warps and wefts were used in comparison with the case where a single layer of warps was used. Thus it was found that the use of multi-layer wefts was effective. The auxiliary wefts densify the texture of the lower layer and preclude the otherwise possible leakage of the paper material under treatment. While two layers of wefts produced an appreciable effect, three or more layers of wefts manifested a fully satisfactory effect. Properly, polyamide monofilaments which are not easily fibrillated are used for the wefts in the uppermost layer and/or the lowermost layer which are flexed to a large extent.

The condensing woven fabric, if produced in a multi-ply construction, may rely on the reinforcing strips to acquire improved tensile strength and rigidity because the fabric tends to have the problem of gathering wrinkles and producing an oblique advance when the solution having the reclaimed paper material unevenly dispersed therein is unevenly supplied thereto to exert an uneven load thereon.

For the purpose of preventing the woven fabric from being broken in the terminal parts of the reinforcing strips, it may be proper to give smaller rigidity to the opposite end parts of the reinforcing strips than in the central part thereof.

In one example of the endless woven fabric contemplated by this invention, a polyurethane resin sheet, 1–1.5 mm in thickness, is laid on the selvage in either end part in the width direction of the woven fabric and simultaneously heated and pressed until the resin thoroughly permeates the woven fabric to the deep interior and reaches the proximity of the surface of the woven fabric on the opposite side. Then, a ridge of the same polyurethane resin as mentioned above is thermally deposited on the surface of the woven fabric opposite the surface presently bearing the sheet mentioned above and the lines of polyurethane resin on the woven fabric are fused integrally. Meanwhile, the reinforcing strips can be produced by laying a polyurethane resin sheet having a length nearly equal to the width of the woven fabric and measuring 1–1.5 mm in thickness on the woven fabric as extended between the opposite ends of the woven fabric and heating and pressing the polyurethane resin sheet until the polyurethane resin dissolves and thoroughly permeates the woven fabric to the deep interior and reaches the proximity of the surface of the woven fabric on the opposite side.

The condensing endless woven fabric for paper material according to this invention continuously removes ink particles, ashes, and minute fibers incapable of forming paper from the aqueous solution of paper material by virtue of the nipping pressure generated between the inner roll and the woven fabric and the centrifugal force generated by the high-speed rotation.

EXAMPLES

Now, working examples of this invention will be described below with reference to the accompanying drawings.

FIG. 1 is a plan view illustrating one example of this invention. Antiflexing parts 7 are disposed on the front side at the opposite ends of a woven fabric 1 and guide ridges 8 are disposed on the side, namely on the running surface side of the woven fabric opposite the side seating the antiflexing parts 7. Reinforcing strips 9 are disposed at a plurality of places perpendicularly to the direction of length of the woven fabric as uniformly spaced. These reinforcing strips 9 impart rigidity to the woven fabric 1 and prevents the woven fabric 1 from gathering wrinkles, producing an oblique advance, or sustaining breakage. In the present example, one of the reinforcing strips 9 connects the opposite ends in the direction of length of the woven fabric to give rise to a connected part 10 and completes an endless woven fabric. A given length of woven fabric can be manufactured into an endless woven fabric by simply abutting the opposite ends of the woven fabric, disposing a reinforcing strip 9 on the abutted part, and fusing the reinforcing strip 9 with the abutted part of the woven fabric in the same manner as described above. This example enjoys very high productivity and permits a generous reduction in cost because it obviates the necessity for the work of weaving connection to form an endless fabric.

Naturally, connecting parts 10 may be formed at a plurality of places. A plurality of short lengths of woven fabric may be connected by means of weaving as in the present example.

Figure 2:
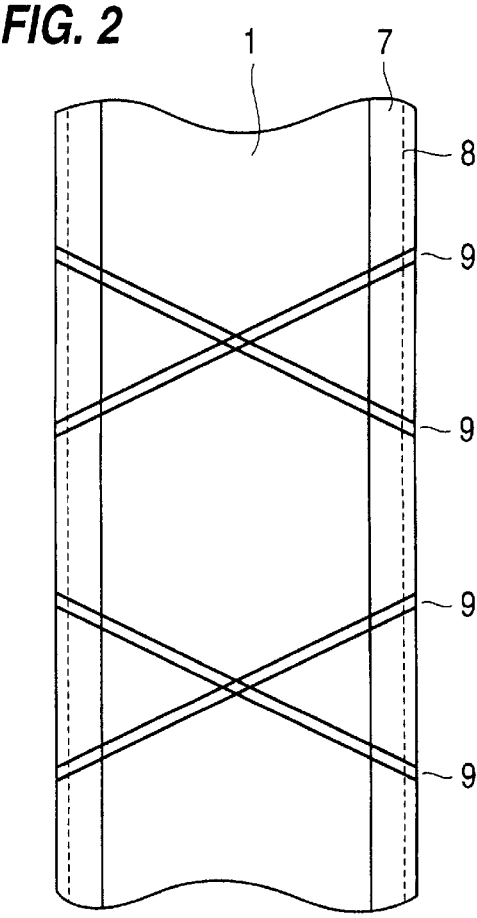
FIG. 2 is a plan view illustrating another example of this invention.

FIG. 2 is a plan view illustrating another example of this invention. In this example, reinforcing strips 9 are disposed as obliquely crossed. These reinforcing strips are appropriate for enhancing rigidity in oblique directions.

FIG. 3 through FIG. 7 are plan views and cross sections illustrating reinforcing strips to be used in the working examples of this invention. These examples represent cases of giving smaller rigidity to the opposite end parts in the direction of width of the reinforcing strips than to the central part thereof. They are appropriate for preventing the woven fabrics from being broken in the end parts of the reinforcing strips.

Figure 3:
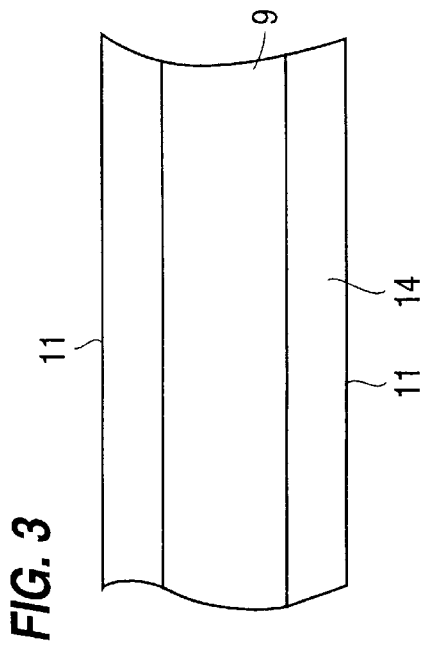
FIG. 3 is a plan view and a cross section illustrating a reinforcing strip to be used in still another example of this invention.
Figure 4:
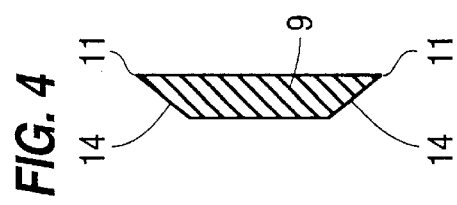
FIG. 4 is a cross section of the reinforcing strip of FIG. 3.

FIG. 3 depicts an example of gradually decreasing the thickness of the end parts 11 of the reinforcing strip 9 in the direction of the central side of the woven fabric to form parts of thin wall 14. FIG. 4 is a cross section taken through the reinforcing strip 9 in the direction of width thereof. The opposite ends are thin-wall parts 14.

Figure 5:
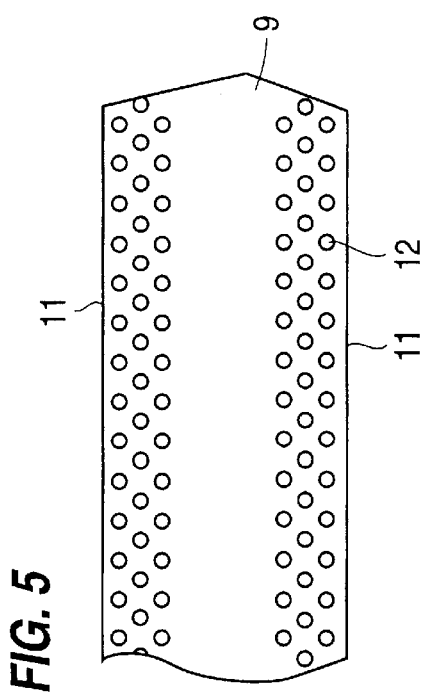
FIG. 5 is a plan view and a cross section illustrating another reinforcing strip to be used in yet another example of this invention.
Figure 6:
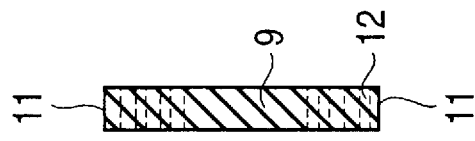
FIG. 6 is a cross section of the reinforcing strip of FIG. 5.
Figure 7:
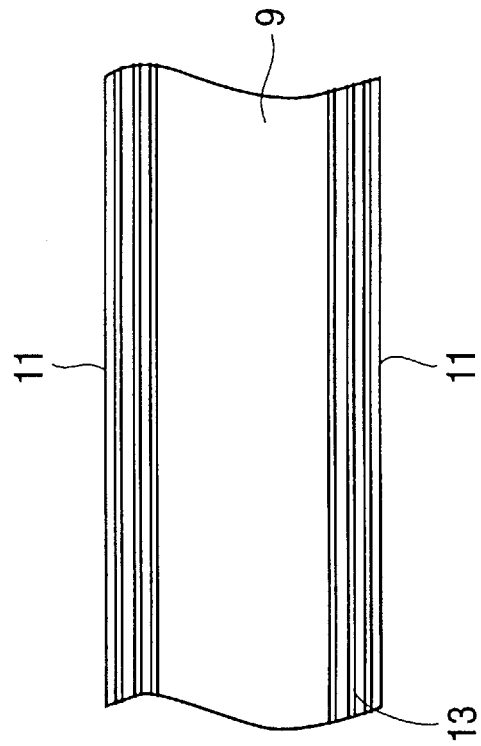
FIG. 7 is a plan view and a cross section illustrating a further reinforcing strip to be used in a further example of this invention.
Figure 8:
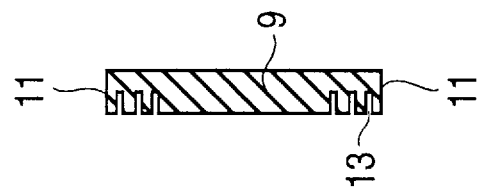
FIG. 8 is a cross section of the reinforcing strip of FIG. 7.
Figure 9:
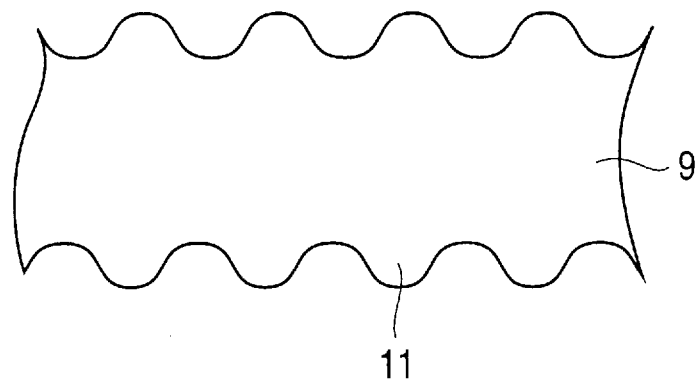
FIG. 9 is a plan view and a cross section illustrating another reinforcing strip to be used in another example of this invention.
Figure 10:
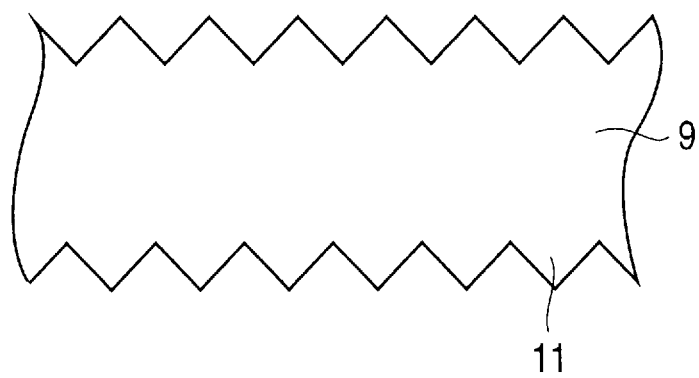
FIG. 10 is a plan view and a cross section illustrating yet another reinforcing strip to be used in yet another example of this invention.

FIG. 5 is a working example of forming small holes 12 in the end parts 11. FIG. 6 is a cross section taken through the reinforcing strip 9 of FIG. 5 in the direction of width. The opposite ends of the reinforcing strip 9 have through holes 12 bored therein. FIG. 7 is a working example of forming grooves 13 incised in the end parts 11 of the reinforcing strip 9. FIG. 8 is a cross section taken through the reinforcing strip 9 of FIG. 7 in the direction of width. The opposite ends of the reinforcing strip have grooves 13 incised therein. FIG. 9 is a working example of giving an undulating cross section to the end parts 11 of the reinforcing strips 9. FIG. 10 is a working example of giving a corrugated cross section to the end parts 11 of the reinforcing strip 9.

Figure 11:
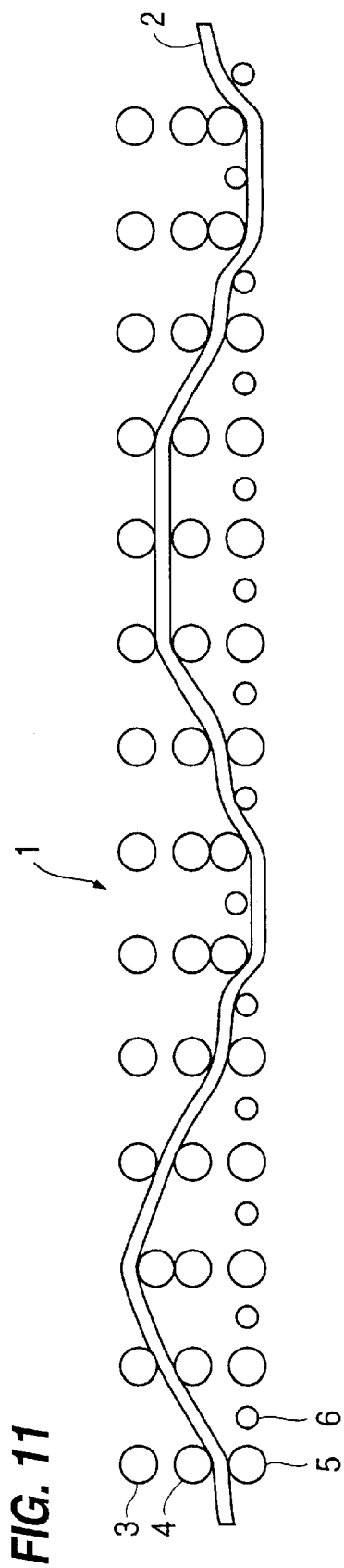
FIG. 11 is a longitudinal section illustrating a woven fabric to be used in the example of this invention.

FIG. 11 is a longitudinal section illustrating a woven fabric used in a working example of this invention. A woven fabric 1 is constructed of one ply of warps and three plies of wefts by interlacing auxiliary wefts 6 between warps 2, upper wefts 3, intermediate wefts 4, lower wefts 5, and lower wefts 5.

Figure 12:
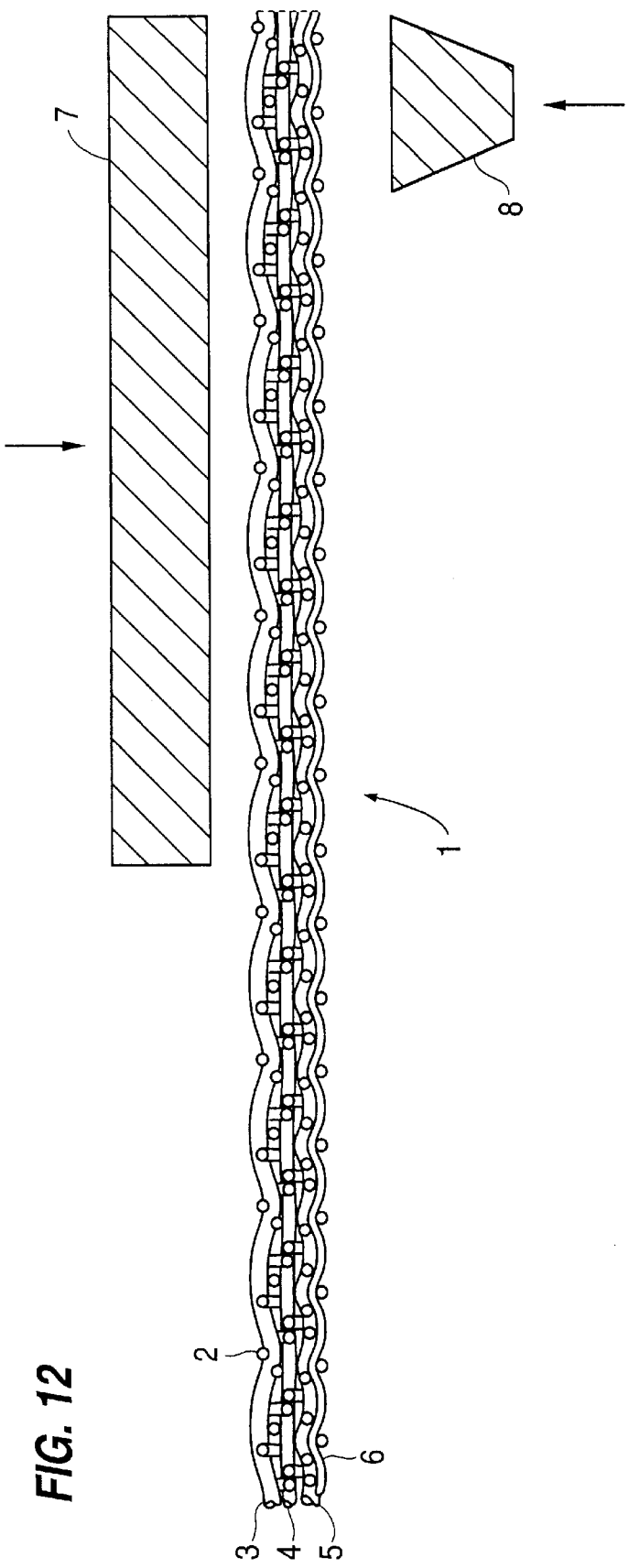
FIG. 12 is a partial section illustrating the state in which an antiflexing part and a guide ridge are ready to be disposed on a woven fabric.

FIG. 12 is a cross section illustrating an antiflexing part 7 and a guide ridge 8 being disposed on a selvage part in the end part in the direction of width of a woven fabric. A woven fabric 1 is composed of warps 2, upper wefts 3, intermediate wefts 4, lower wefts 5, and auxiliary wefts 6. The antiflexing part 7 of polyurethane resin sheet is laid on one surface in the end part in the direction of width and the guide ridge 8 having a cross section of the shape of a trapezoid is fused on the other side.

Figure 13:
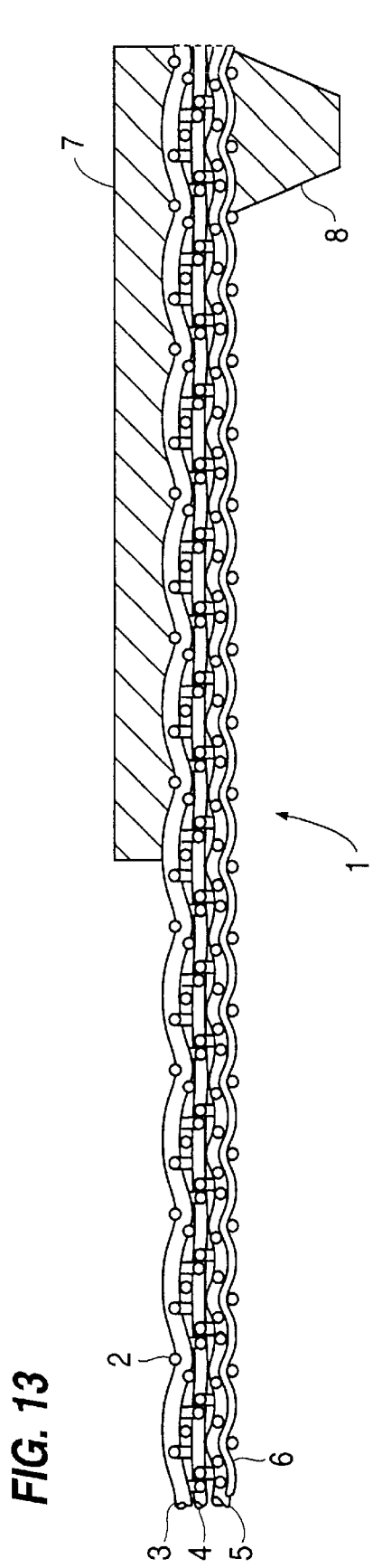
FIG. 13 is a partial section illustrating the state in which the antiflexing part and the guide ridge have been disposed as integrally bonded to the woven fabric.

FIG. 13 is a cross section of the end part of a woven fabric 1 provided with an antiflexing part 7 and a guide ridge 8. It is clearly noted from the diagram that the polyurethane resin in the antiflexing part 7 fastened by the application of heat and pressure to the woven fabric 1 permeates the texture of the woven fabric and reaches the proximity of the surface on the opposite side. The antiflexing part 7 is formed in this manner. The guide ridge 8 is likewise fastened by the application of heat and pressure, with part thereof permeating the texture of the woven fabric 1 and integrally fused with the antiflexing part 7. Thus, the selvage of the woven fabric 1 has the structure being enveloped with polyurethane resin. The woven fabric 1, therefore, is not flexed even in the proximity of the inner lateral surface of the guide ridge 8. The woven fabric offers strong resistance to flexure and defies breakage by fibrillation because wefts are laid in three layers in the proximity of the antiflexing part 7 as well.

Figure 14:
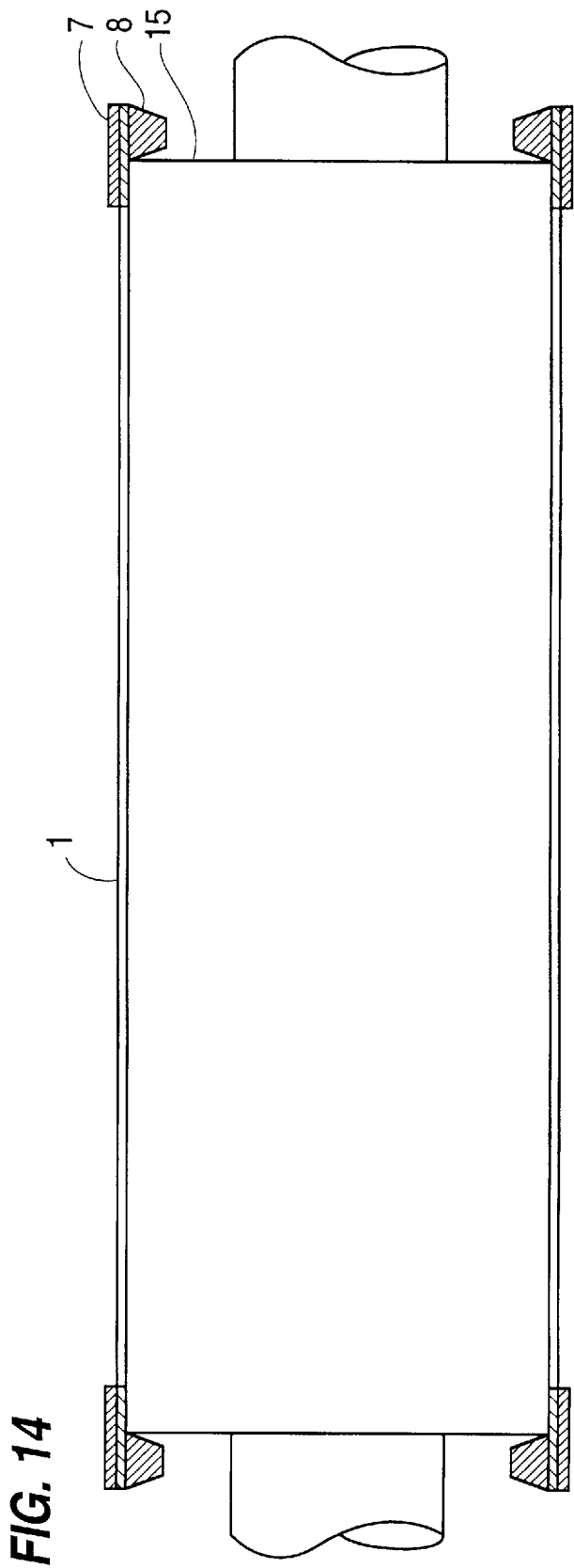
FIG. 14 is a cross section illustrating the woven fabric of this invention laid taut over rolls.

FIG. 14 is a cross section illustrating a woven fabric 1 of this invention laid over an inner roll 15. Guide ridges 8 are held in contact with the end faces of the inner roll 15. In this example, the ridges 8 are disposed on the selvages of the opposite ends of the woven fabric 1. The prevention of the oblique advance of the woven fabric 1 can be attained by disposing such ridges 8 only on the selvage of one side. Thus, the accidental separation of the woven fabric from the inner roll 15 will not occur.

Figure 15:
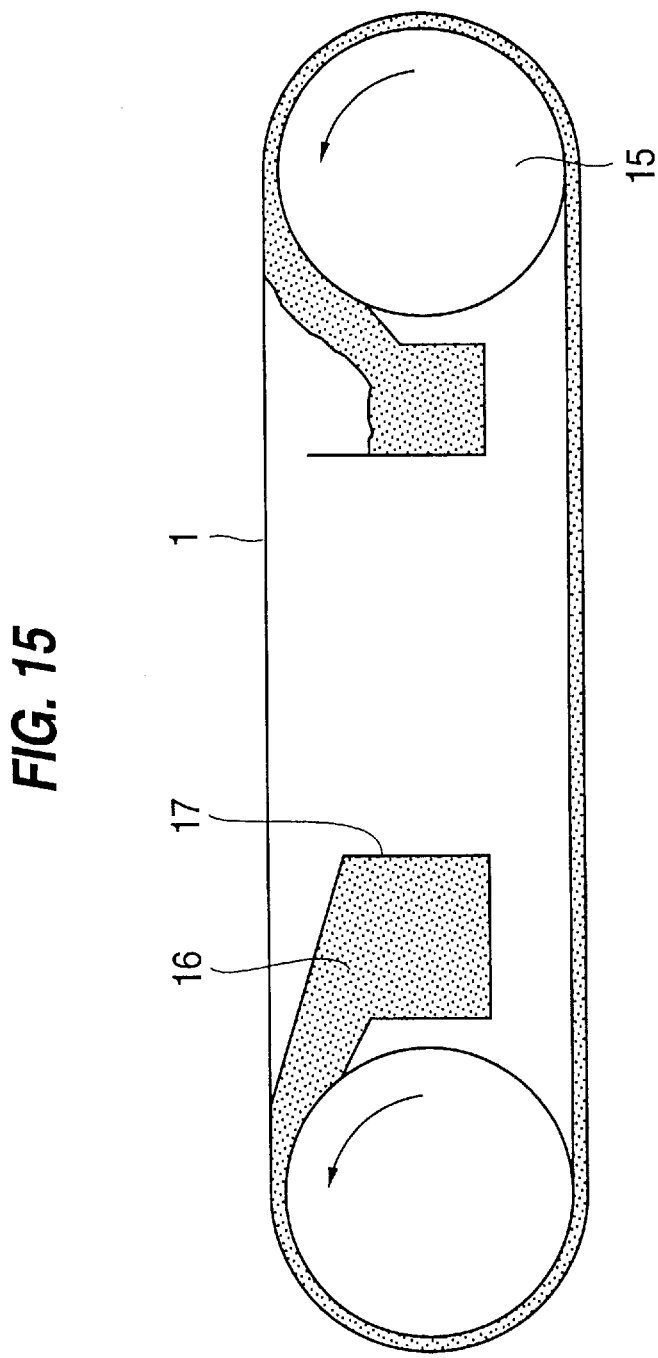
FIG. 15 is an explanatory diagram illustrating a process for condensing pulp.

FIG. 15 is an explanatory diagram of a condensing apparatus for condensing paper material reclaimed from old paper by the use of a woven fabric of this invention.

A paper material 16 emanating from a head box 17 is supplied into the gap between the woven fabric 1 and an inner roll 15, compressed between the inner roll 15 and the woven fabric, dehydrated centrifugally in the folding part, and collected.

Figure 16:
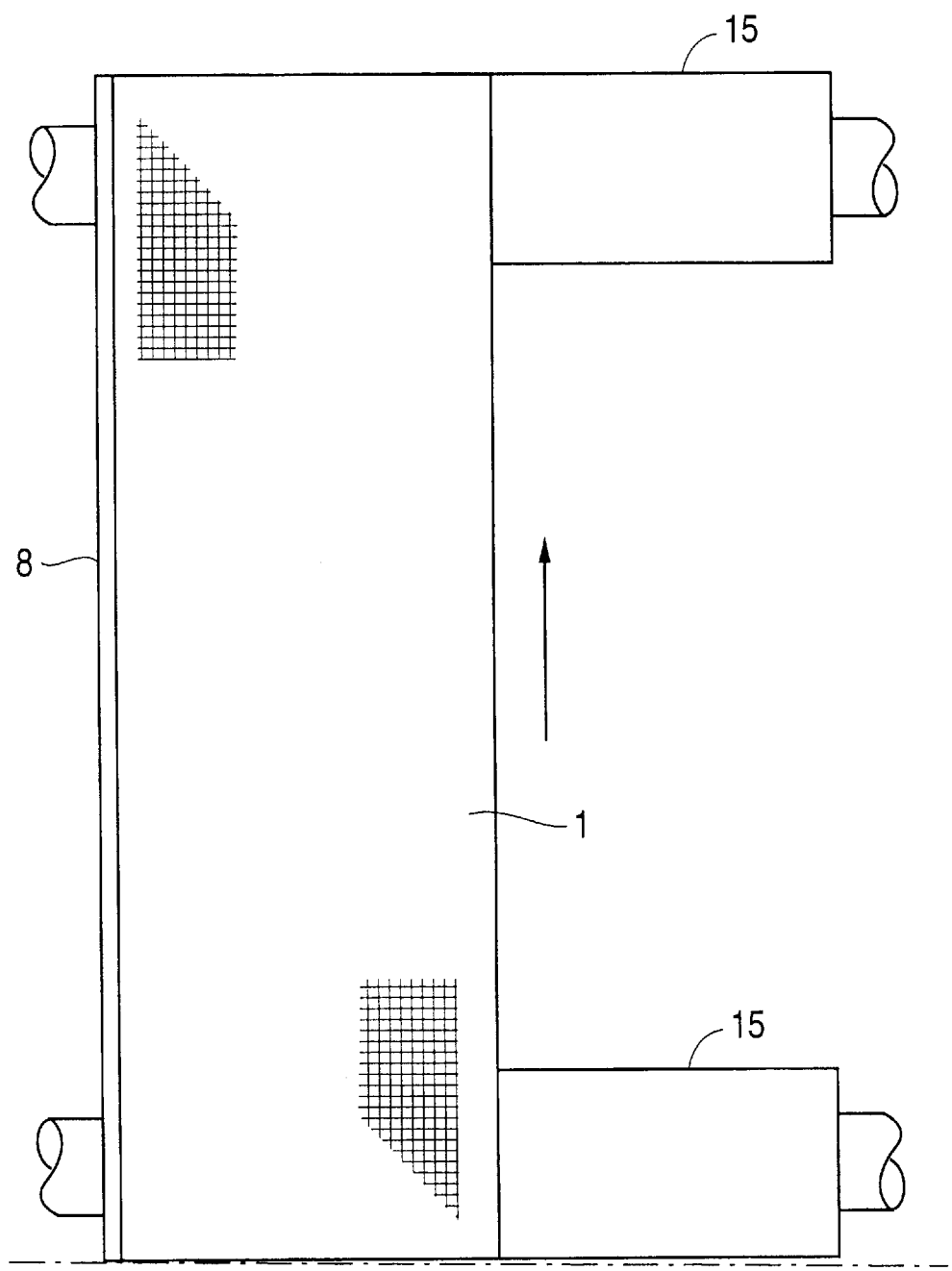
FIG. 16 is an explanatory diagram illustrating a method for performing a comparative test.

FIG. 16 is an explanatory diagram of an apparatus used for a comparative experiment. Two inner rolls 15 are so disposed as to differentiate the peripheral lengths of the left and right end parts of the woven fabric and cause the woven fabric to produce an oblique advance.

COMPARATIVE EXPERIMENT

Woven fabrics used as a working example and those used in comparative experiments are shown in Table 1.

The same woven fabrics were used in Comparative Examples 1 and 2 as indicated in Table 1.

TABLE 1

| | | Example | Comparative Example 1 | Comparative Example 2 |
|---|---|---|---|---|
| Upper warps | Material | PET | PET | PET |
| | Diameter (mm) | 0.17 | 0.30 | 0.30 |
| | Number of yarns (pieces/inch) | 155 | 32 | 32 |
| Lower warps | Material | | PET | PET |
| | Diameter (mm) | | 0.20 | 0.20 |
| | Number of yarns (pieces/inch) | | 64 | 64 |
| Upper wefts | Material | P.A | PET | PET |
| | Diameter (mm) | 0.30 | 0.35 | 0.35 |
| | Number of yarns (pieces/inch) | 40 | 32 | 32 |
| Intermediate wefts | Material | PET | | |
| | Diameter (mm) | 0.25 | | |
| | Number of yarns (pieces/inch) | 40 | | |
| Lower wefts | Material | PET | PET | PET |
| | Diameter (mm) | 0.20 | 0.20 | 0.20 |
| | Number of yarns (pieces/inch) | 40 | 64 | 64 |
| Auxiliary wefts | Material | PA | | |
| | Diameter (mm) | 0.13 | | |
| | Number of yarns (pieces/inch) | 40 | | |
| Binding yarns | Material | | PET | PET |
| | Diameter (mm) | | 0.15 | 0.15 |
| | Number of yarns (pieces/inch) | | 16 | 16 |

Example

An endless woven fabric of FIG. 1 was obtained by thermally fusing a polyurethane resin sheet, 0.082 g/cm$^2$ in basis weight and 1 mm in thickness, in a selvage on a woven fabric, 1.05 mm in thickness, formed of one ply of warps and three plies of wefts as shown in Table 1, thereby depositing an antiflexing part and thermally fusing a guide ridge thereon.

Reinforcing strips of a polyurethane resin sheet, 0.041 g/cm$^2$ in basis weight, 0.5 mm in thickness, and 30 mm in width, were thermally fused as spaced with an interval of 500 mm.

Comparative Example 1

An endless woven fabric disclosed in Japanese Laid-open Patent No. 2-14090/1990 was obtained by binding two vertically arrayed woven fabrics with a binding yarn thereby forming a woven fabric of two vertically superposed plies, 1.10 mm in thickness, as shown in Table 1 and sewing guide ridges of polyurethane resin to the selvages with a yarn.

Comparative Example 2

An endless woven fabric disclosed in Japanese Laid-open Patent No. 4-361682/1992 was obtained by preparing the same woven fabric as in Comparative Example 1 and disposing antiflexing parts and thermally fusing guide ridges in the same manner as in the working example.

Testing Method

The apparatus shown in FIG. 16 was used. Specifically, a given sample woven fabric was laid over two rolls so disposed as to differentiate the peripheral lengths on the left and the right and cause the woven fabric to produce an oblique advance and it was rotated at a rate of 600 m/min. The results are shown in Table 2.

TABLE 2

| Example | Time |
| --- | --- |
| Working Example | No change observed after the elapse of 100 hours. |
| Comparative Example 1 | Breakage observed near inner lateral face of ridge after the elapse of 43 hours |
| Comparative Example 2 | Breaking observed near antiflexing part after the elapse of 87 hours |

As shown above, the woven fabric of this invention withstands a protracted service without inducing any breakage in the selvages or in the proximity of the antiflexing part.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

What is claimed is:

1. An endless fabric for condensing paper material comprising: an endless fabric having an outer surface, a running surface opposite to the outer surface and two selvages formed by weaving plastic monofilaments; an antiflexing part being formed on the outer surface by filling said endless fabric with first thermoplastic resin at at least one of the selvages; a guide ridge formed of second thermoplastic resin and integrally welded on the running surface with said second thermoplastic resin which fills the running surface of said antiflexing part; and a reinforcing strip formed by filling not less than 85% of the empty space in said endless fabric with third thermoplastic resin in a length nearly equal to the width of said endless fabric as extended between the selvages, wherein said endless fabric is a multi-ply woven fabric formed by plastic monofilament wefts in at least three layers, the layers comprise at least an uppermost layer, a intermediate layer and a lowermost layer, said wefts being interlaced with plastic monofilament warps, and wherein said reinforcing strip is platelike and has two opposite end parts in the width direction and a central part and wherein said opposite end parts are weaker in rigidity than the central part.

2. An endless fabric for condensing paper material according to claim 1, wherein an auxiliary weft is interposed between the wefts forming the lowermost layer.

3. An endless fabric for condensing paper material according to claim 1, wherein each of the plastic monofilament wefts is a nylon monofilament.

4. An endless fabric for condensing paper material according to claim 1, wherein the plastic monofilament weft in the uppermost layer is a nylon monofilament.

5. An endless fabric for condensing paper material according to claim 1, wherein the plastic monofilament wefts in the uppermost and the lowermost layers are nylon monofilaments.

6. An endless fabric for condensing paper material according to claim 1, wherein a plastic monofilament weft in the uppermost layer and an auxiliary weft in the lowermost layer are nylon monofilaments.

7. An endless fabric for condensing paper material according to claim 1, wherein a plastic monofilament weft in the intermediate layer is a nylon monofilament.

8. An endless fabric for condensing paper material according to claim 1, wherein the first thermoplastic resin does not protrude from the running surface.

9. An endless fabric for condensing paper material according to claim 1, wherein the first thermoplastic resin is the same as the second thermoplastic resin.

10. An endless fabric for condensing paper material according to claim 1, wherein said first, second or third thermoplastic resin is polyurethane resin or vinyl chloride resin.

11. An endless fabric for condensing paper material according to claim 1, wherein a plurality of said reinforcing strips disposed is equally spaced.

12. An endless fabric for condensing paper material according to claim 1, wherein a plurality of said reinforcing strips is equally spaced on said endless fabric perpendicularly to the direction of length of said endless fabric.

13. An endless fabric for condensing paper material according to claim 1, wherein said reinforcing strip is formed of polyurethane resin or vinyl chloride resin.

14. An endless fabric for condensing paper material according to claim 1, wherein thickness of said opposite end parts gradually decreases in the direction of width of the reinforcing strip.

15. An endless fabric for condensing paper material according to claim 1, wherein said opposite end parts have small holes.

16. An endless fabric for condensing paper material according to claim 1, wherein said opposite end parts have grooves.

17. An endless fabric for condensing paper material according to claim 1, wherein said opposite end parts are in an undulated form.

18. An endless fabric for condensing paper material according to claim 1, wherein said opposite end parts are in a corrugated form.

19. An endless fabric for condensing paper material according to claim 1, wherein said endless fabric is formed by: abutting two ends of a woven fabric; disposing a reinforcing strip on the abutted ends of the woven fabric; and fastening said reinforcing strip to said two ends by application of heat and pressure, whereby the woven fabric is made endless.

20. An endless fabric for condensing paper material according to claim 1, wherein said endless fabric is formed by: abutting opposite ends of a woven fabric to form an abutting part; disposing a reinforcing strip on the abutting part; and fastening said reinforcing strip to said abutting part by application of heat and pressure.

21. An endless fabric for condensing paper material according to claim 1, wherein said antiflexing part has 30–50 mm in width.

22. An endless fabric for condensing paper material according to claim 1, wherein said antiflexing part is formed by filling not less than 85% of an empty space in said endless fabric with the first thermoplastic resin.

23. An endless fabric for condensing paper material according to claim 1, said warps form a single layer.

\* \* \* \* \*